(12) United States Patent
Sivakumar et al.

(10) Patent No.: US 10,070,460 B2
(45) Date of Patent: Sep. 4, 2018

(54) SCHEDULED WIFI IN SINGLE COLLISION DOMAIN

(71) Applicants: Raghupathy Sivakumar, Atlanta, GA (US); Chao-Fang Shih, Smyrna, GA (US)

(72) Inventors: Raghupathy Sivakumar, Atlanta, GA (US); Chao-Fang Shih, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 63 days.

(21) Appl. No.: 15/290,744

(22) Filed: Oct. 11, 2016

(65) Prior Publication Data

US 2017/0105211 A1    Apr. 13, 2017

Related U.S. Application Data

(60) Provisional application No. 62/240,206, filed on Oct. 12, 2015.

(51) Int. Cl.
| | |
|---|---|
| *H04W 4/00* | (2018.01) |
| *H04W 72/12* | (2009.01) |
| *H04W 84/12* | (2009.01) |
| *H04W 74/08* | (2009.01) |

(52) U.S. Cl.
CPC .... *H04W 72/1289* (2013.01); *H04W 74/0816* (2013.01); *H04W 84/12* (2013.01)

(58) Field of Classification Search
CPC .. H04W 72/0446; H04W 72/12; H04W 84/12
See application file for complete search history.

(56) References Cited

U.S. PATENT DOCUMENTS

| | | | | |
|---|---|---|---|---|
| 8,155,140 | B1* | 4/2012 | Husted | H04W 74/0808 370/338 |
| 2011/0274056 | A1* | 11/2011 | Sampath | H04B 7/0695 370/329 |
| 2015/0257106 | A1* | 9/2015 | Mujtaba | H04W 52/0238 370/311 |
| 2016/0037553 | A1* | 2/2016 | Attar | H04W 74/04 370/338 |

FOREIGN PATENT DOCUMENTS

WO    2006/092583 A1    9/2006

* cited by examiner

*Primary Examiner* — Abdelnabi O Musa
(74) *Attorney, Agent, or Firm* — Bryan W. Bockhop; Bockhop Intellectual Property Law, LLC

(57) ABSTRACT

In a method for clients to transmit data via a shared medium network, a schedule assigns time slots to individual clients. A collision avoidance scheme determines an offset time to begin transmitting data, which upon expiration, a client senses if any of the clients is transmitting. If a second client is transmitting, then each client sets a first time slot assigned to the second client on the transmission schedule as a starting time slot. The clients track the schedule and transmit to the access point during the next time slot assigned to each client. If no other client is transmitting, then a client transmits data to the access point, sets the first time slot assigned to it as the starting time slot. The schedule is tracked by the clients and they transmit data to the access point during each successive time slot assigned to them.

23 Claims, 4 Drawing Sheets

SCHEDULED WIFI IN SINGLE COLLISION DOMAIN

CROSS-REFERENCE TO RELATED APPLICATION(S)

This application claims the benefit of U.S. Provisional Patent Application Ser. No. 62/240,206, filed Oct. 12, 2015, the entirety of which is hereby incorporated herein by reference.

STATEMENT OF GOVERNMENT INTEREST

This invention was made with government support under agreement Nos. IIP-1343435 and CNS-1319455, awarded by the National Science Foundation. The government has certain rights in the invention.

BACKGROUND OF THE INVENTION

1. Field of the Invention

The present invention relates to data communications systems and, more specifically, to a data communication system that communicates via a shared medium network.

2. Description of the Related Art

Shared medium networks, as used herein, are data communication networks in which several client devices communicate with an access point over a shared physical communication medium. A wireless local area network (often referred to as a "Wi-Fi network") is an example on one type of shared medium network, in which several client devices transmit and receive data on a common wireless frequency channel. Generally, only a single device can transmit data at a time in such networks. Given that communicating devices on such networks often transmit and receive at irregular intervals, they require mechanisms to avoid contention between the devices.

Most Wi-Fi deployments today use the distributed coordination function (DCF) mode of the IEEE 802.11 standard to avoid contention between devices. The DCF mode of operation is simple and scalable, and requires a participating node to listen to the channel and make contention decisions purely on locally available information. The contention algorithm in turn is controlled by a set of parameters including the maximum contention window that are adaptively adjusted based on local information. While the approach is simple and scalable, the goal of DCF is to achieve coarse-level fairness and efficiency in the network. Any finer-level goals are usually considered to be beyond the scope of DCF.

The IEEE 802.11 point coordination function (PCF) mode, on the other hand, relies on centralized scheduling by the access-point (AP). Theoretically, the scheduling algorithm at the AP can be arbitrarily defined. The problems with PCF are two-fold, including: 1) it uses a polling process that incurs heavy overhead, especially in dynamic load conditions, and 2) the standard does not specify how APs should coordinate with each other to prevent collisions across cells.

There has been interest lately on the problem of achieving the benefits of centralized scheduling while retaining the simplicity and scalability benefits of distributed operations. The benefits of centralized scheduling are the following:

Predictability: Applications and services that require predictable service can expect to receive it in a setting with centralized scheduling. The central scheduler has complete control over what is transpiring in the network, and hence provides assurances.

Differentiation: Applications and services can be provided with different resource allocations depending on their requirements. While there are distributed approaches to accomplish this goal (e.g., IEEE 802.11e), they may be quite coarse in the differentiation they provide.

Efficiency: In environments where operational efficiency is an issue (e.g., in high-density Wi-Fi deployments), centralized scheduling can lead to higher efficiencies.

On the other hand, the advantages of purely distributed operations are the lack of a single point of failure or bottleneck, scalability with the number of nodes, and backward compatibility with how Wi-Fi is predominantly used today.

While the DCF standard offers efficiency, it offers a low level of control. This can be important when different processes have different priorities. For example, a device streaming a movie on a wireless device would need a higher level of continuity in data transmission than a device engaged in a periodic operating system update. However, with a typical DCF communication system, both devices would communicate with the same priority—which could result in a lower quality of service for the device streaming the movie.

PCF offers a higher level of control. However, it is less efficient because it spends time polling the devices to see if they have data to transmit.

Therefore, there is a need for a data communication system that is both efficient and that allows a high level of control among the transmitting devices.

SUMMARY OF THE INVENTION

The disadvantages of the prior art are overcome by the present invention which, in one aspect, is a method for a first client of a plurality of clients to transmit data to an access point via a shared medium network. A transmission schedule, which assigns transmission time slots to individual clients of the plurality of clients, is received from the access point. A collision avoidance scheme is performed to determine an offset amount of time to begin transmitting data. When the offset amount of time has expired, the first client senses if any of the plurality of clients is transmitting data on the network and executes the following steps: If a second client of the plurality of clients is transmitting data, then the first client sets a first time slot assigned to the second client on the transmission schedule as a starting time slot. The first client also tracks the transmission schedule and transmits data to the access point during the next time slot assigned to the first client after the starting time slot. If no other client is transmitting data, then the first client transmits data to the access point, sets the first time slot assigned to the first client as the starting time slot and tracks the transmission schedule and transmits data to the access point during the next time slot assigned to the first client after the starting time slot. The transmission schedule is tracked by the first client and the first client transmits data to the access point during each successive time slot assigned to the first client. When the current time slot has been assigned to the first client, the first client sets an offset time associated with the first client to zero, thereby causing the first client to begin transmitting data to the access point.

In another aspect, the invention is a method of controlling transmission from a plurality of clients to an access point via a shared medium network. The access point publishes a transmission schedule to each of the plurality of clients. The transmission schedule assigns transmission time slots to individual clients of the plurality of clients. Each client performs a collision avoidance scheme to determine which of the plurality of clients will be a first winning client of the plurality of clients. Data is transmitted from the winning client to the access point during a first time slot assigned to the winning client and each client sets a current time slot as a first time slot in the transmission schedule. During each next time slot subsequent to the first time slot assigned to the winning client, the client assigned to the next time slot is allowed to transmit data to the access point. Each client tracks the schedule and transmits data at a subsequent assigned time slot. When one of the clients detects that a current time slot is assigned to that one of the clients, that one of the clients sets its offset time to zero, thereby causing that one of the clients to begin transmitting data.

In yet another aspect, the invention is a digital communications system that includes an access point and a plurality of clients. The access point is in communication with a shared medium network and generates a transmission schedule that assigns transmission time slots. Each of the plurality of clients is in communication with the shared medium network and each client is configured to: receive the transmission schedule, in which each transmission time slot is assigned to one of the plurality of clients; perform a collision avoidance scheme to determine an offset amount of time to begin transmitting data; a when the offset amount of time has expired, then sense if any of the plurality of clients is transmitting data on the network and execute the following: if a second client of the plurality of clients is transmitting data, then set a first time slot assigned to the second client on the transmission schedule as a starting time slot, track the transmission schedule and transmit data to the access point during the next time slot assigned to the first client after the starting time slot; and if no other client is transmitting data, then transmit data to the access point, set the first time slot assigned to the first client as the starting time slot and track the transmission schedule and transmitting data to the access point during the next time slot assigned to the first client after the starting time slot. Each of the plurality of clients is also configured to, after the first time slot, track the transmission schedule, set an offset time to zero when a current time slot is detected to be assigned to the client, which causes the client to transmit data to the access point.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
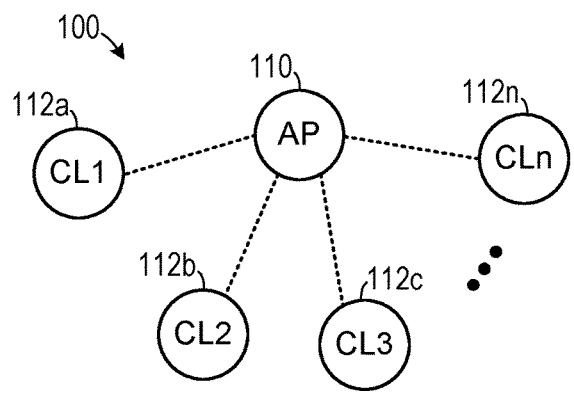
FIG. 1 is a schematic diagram showing a prior art shared medium network.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

As shown in FIG. 1, one example of a shared medium network 100 that can be used with the present invention includes an access point 110, which can be in communication with another network such as the global computer network. The access point 110 communicates with a plurality of clients 112a-n via a shared medium network, which could include a Wi-Fi network. In a Wi-Fi embodiment, the access point 110 could be a Wi-Fi router and the clients 112a-n could include various devices (e.g., tablet computers, smart phones, etc.) in communication with the Wi-Fi router.

Figure 2:
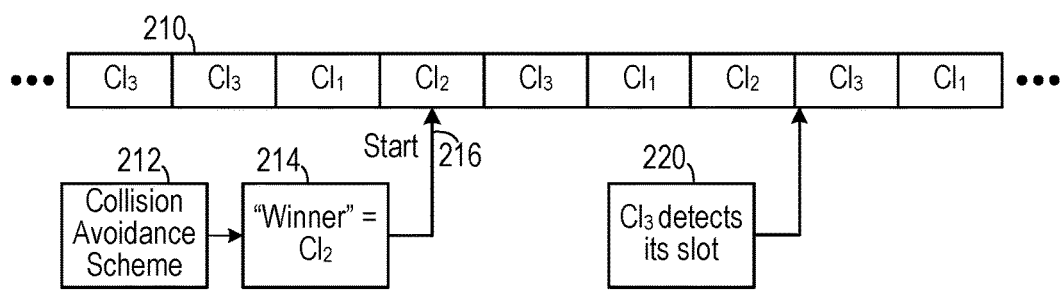
FIG. 2 is a schematic diagram showing an example of a transmission schedule employed in one embodiment of the invention.

As shown in FIG. 2, the access point will generate a schedule 210 that sets forth time slots assigned to the clients and transmits the schedule to all of the clients periodically. The schedule can be adjusted by a schedule controller (such as the access point) based on various factors. For example, if one of the clients exits the network, then the schedule can be adjusted to delete that client. Similarly, the schedule can be adjusted to reflect priorities of data transmission (e.g., streaming video can be given a higher priority that routine administrative data transmission, etc.). When a new schedule is received, each of the clients will implement a collision avoidance scheme 212 (such as a DCF collision avoidance scheme) to determine which client is to be the first to begin transmitting on the schedule. In the example shown, client $CL_2$ is the "winner" (the first to enter the schedule), which causes all of the clients to set a start pointer 216 at the first slot on the schedule 210 assigned to client $CL_2$. Since all of the clients are listening to the network and all of the clients employ the same collision avoidance scheme, each client will know exactly where the system is in the schedule. Based on that information, each client will wait until its next slot to begin transmitting. In the example shown, when client $CL_3$ subsequently determines that its next slot has arrived 220, it begins transmitting and each of the clients set the pointer to that slot.

Figure 3:
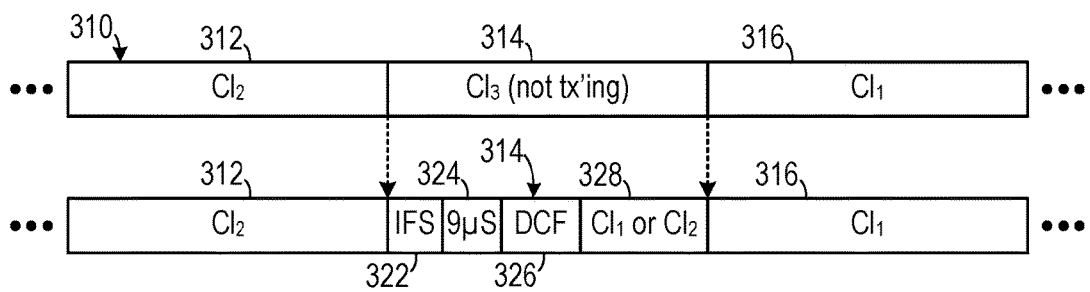
FIG. 3 is a schematic diagram demonstrating one method by which clients compete for a time slot that is not currently being used.

During certain situations, a client will not transmit data during its assigned slot. This could be because the client is currently idle or it could be due to other reasons. In this situation, the invention allows the other clients to contend for the now-vacant time slot by engaging in a DCF-type collision avoidance scheme to compete for the slot, as shown in FIG. 3. In this case (which in this example shows only three clients in the network for the sake of simplicity—it should be noted that the invention could connect many more clients to the network than just three), the published schedule 310 lists time slot 312 assigned to $CL_2$, time slot 314 assigned to $CL_3$, and time slot 316 assigned to $CL_1$. After client $CL_2$ has completed transmission during its time slot 314, the next slot is assigned to $CL_3$; however, after an "inter-frame space" 322 (a short amount of time that separates the end on each time slot from the beginning of the next), during a fixed time offset 324 (e.g., 9 μSec.) the other clients do not detect data transmission on the network. Therefore, at the end of the fixed time offset 324 the other clients will engage in a collision avoidance scheme 326 to determine which of the other clients will be able to transmit data during the time remaining 328 during that slot 314. At the end of the slot 314 the clients return to following the originally-published schedule 310 and, in this example, client $CL_1$ will transmit data during the next slot 316.

In this system, it is important for each of the clients to detect which of the other clients is transmitting at any given time to facilitate tracking the schedule. When transmitting, each client typically identifies itself with a media access control (MAC) address when communicating with the access point and each client tracks transmissions by the other clients by associating each transmission with the transmitting client's MAC address. At times, a client might experience degradation of another client's MAC address (for example, a MAC address bit in a transmission from a distant client might be corrupted due to interference). Rather than stopping the schedule to retrieve the correct MAC address in this type of situation, the client will resolve the MAC address using a Viterbi algorithm in which the system employs an address path tree that explores only addresses that are known to be on the network.

The Viterbi algorithm is a dynamic algorithm for finding the most likely sequence of hidden states in a sequence of observed events. The present invention modifies the Viterbi algorithm to consider only the MAC addresses of devices known to be in the network.

Figures 4A, 4B:
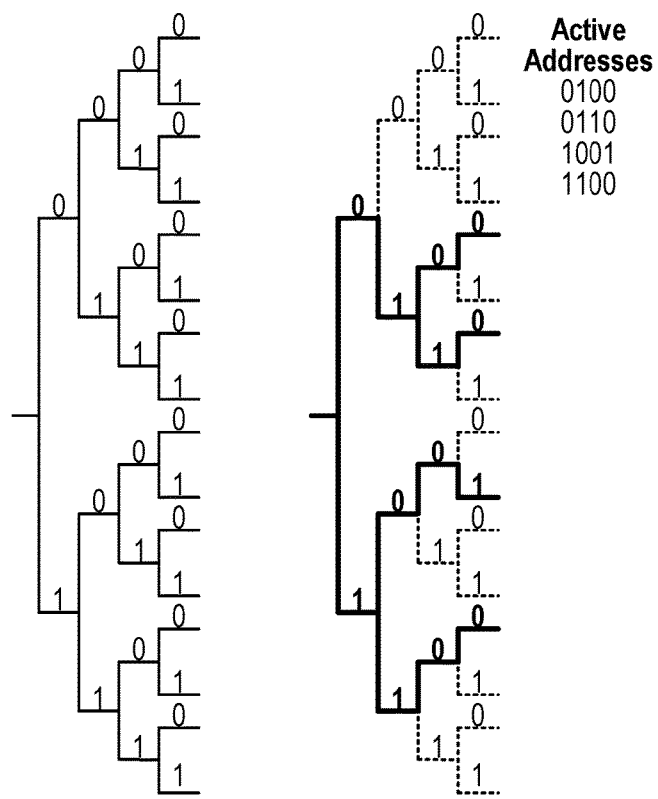
FIGS. 4A-4B are schematic diagrams of decision paths demonstrating a conditional Viterbi algorithm.

For example, as shown in FIG. 4A, in an example in which each address has four bits (actual MAC addresses include 48 bits), a prior art Viterbi algorithm would consider all four bits in its decision path, which would result in considering 16 permutations in 15 decision points. In the conditional Viterbi algorithm, a decision path will be taken only if it is known that that a value for a bit is within the set of active addresses. In the example shown in FIG. 4B, only the following addresses are active on the network: 0100, 0110, 1001, and 1100. Thus, the permutations represented in dotted lines are ignored and the algorithm needs only to consider 4 permutations with 2 decision points. This could represent a significant increase in the probability of a correct decision when trying to resolve a MAC address (which presents about $2.8 \times 10^{14}$ different decision points in a conventional Viterbi algorithm) and a significant time savings.

Figure 5A:
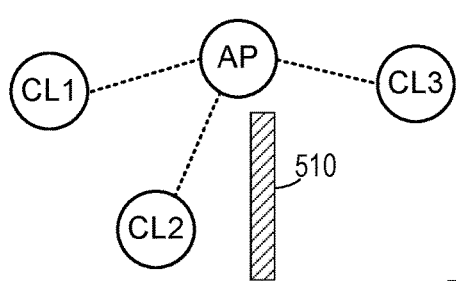
FIG. 5A is a schematic diagram showing a situation in which two clients may not be able to receive transmissions from each other.
Figure 5B:
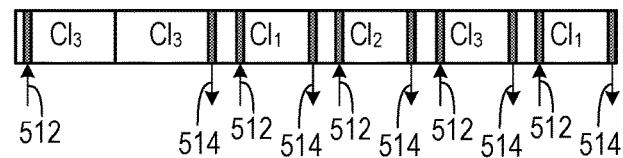
FIG. 5B is a schematic diagram demonstrating one method of dealing with the situation shown in FIG. 5A.

In certain situations, one of the clients might be prevented from receiving data from one of the other clients. For example, as shown in FIG. 5A, client $CL_2$ and client $CL_3$ might not be able to receive transmissions from each other due to an obstruction 510, such as a wall. Therefore, so that each client can track the schedule in this type of situation, the access point will transmit to all of the clients a "trans-mission start" signal 512 early during each client's transmission slot if a client is transmitting during the slot and a "transmission stop" signal 514 at the end of each transmission. By doing this, each client will know when the other clients are transmitting data, even when they may not be able to receive a transmission.

Figure 6A:
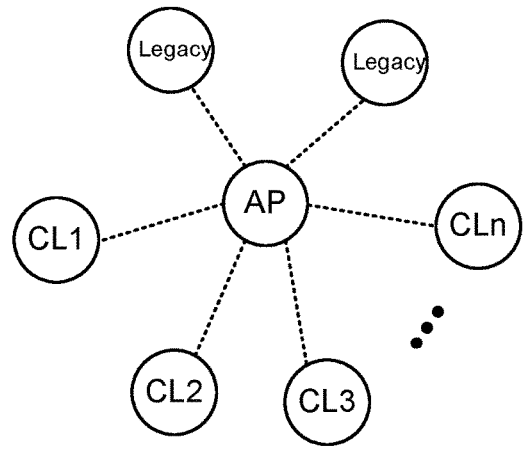
FIG. 6A is a schematic diagram showing an arrangement that includes legacy systems.
Figure 6B:
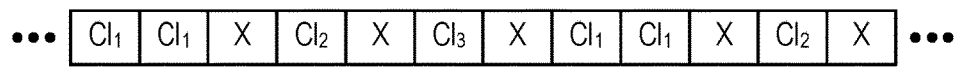
FIG. 6B is a schematic diagram showing one method of including legacy systems.

The system also accommodates clients that can only use legacy systems (e.g., pure DCF) in the network, as shown in FIG. 6A. In such a situation, as shown in FIG. 6B, the schedule will include time slots (designated as "X" in the figure) in which all of the clients will compete for a slot using the legacy system rather than the scheduled-based system.

In one embodiment, referred to herein as "LWT" (which stands for "look who's talking"), in a simple scenario with a fully connected topology, overheard packets can be successfully decoded and nodes are always backlogged. This scenario will be explored using a baseline algorithm of LWT, referred to as "LWT-Baseline." Conventional scheduled Wi-Fi is achieved by centralized scheduling protocols through the following steps in each node: i) access to the target schedule, ii) get the current schedule slot, iii) trigger a specific transmission, iv) know when the current transmission ends, v) adjust to the next schedule slot, and get back to step iii). Similarly, LWT achieves scheduled Wi-Fi through the following steps in each node: i) receive the broadcast of the target schedule, ii) use "position synchronization" to get the current schedule slot, iii) reuse backoff mechanism for self-triggering, iv) track transmission completions, v) move the "position pointer" to the next schedule slot, and get back to step iii). Below, are details of each step in LWT:

Broadcast of Schedule

In LWT, APs (access points) broadcast the target schedule S to all nodes. S can be put into a beacon every few seconds. Broadcasting generates negligible overheads, which is: $(k \times 48 \times 2)/(R_b \times T_p)$ (the time percentage used to transmit S), where 48 bits is the length of a MAC address, k is the length of S, $R_b$ is the sending rate of beacons, and $T_p$ is the period of updating S. Consider $R_b$=6 Mbps, k=100, and $T_p$=1 s, the overhead of broadcasting S is only 0.2%.

Position Synchronization

Figure 7:
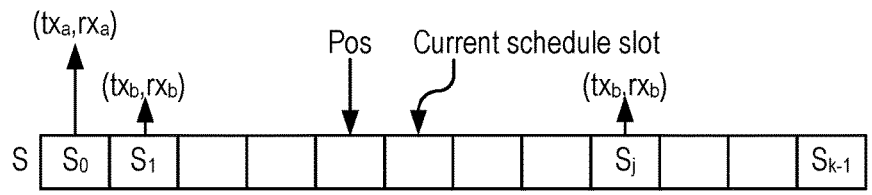
FIG. 7 is a schematic diagram demonstrating one baseline method according to one embodiment of the invention.

In order to follow a schedule, nodes need to know the current schedule slot. In LWT, this is achieved by synchronization in a schedule position pointer Pos. Each node in the network maintains a schedule pointer Pos that points to a position (0 to k−1) in the schedule; the next position where Pos points to is the current schedule slot, as shown in FIG. 7.

Pos synchronization is achieved by transmission overhearing. Initially, nodes perform random backoff as in DCF. Once a node wins the contention and finishes a transmission successfully, all nodes learn the MAC addresses of the Rx and Tx of this transmission through overhearing. Then, all nodes find the smallest position of this transmission in S, and set Pos to that position. For example, in FIG. 7, the smallest position of link $(tx_b, rx_b)$ is 1. Matching a link to the smallest position avoids ambiguity when a link is scheduled multiple times. Pos synchronization gives all nodes a common current schedule slot. After the first synchronization, it is sufficient to maintain Pos synchronization by incrementing the position of Pos after each transmission. Note that since DCF requires nodes to always listen to the channel for the backoff mechanism, nodes can track the start and end time of schedule slot. Also, the active listening time of LWT is the same as that of DCF.

Algorithm 1, below, illustrates the Pos synchronization of LWT-Baseline. Assume that a target schedule $S=\{s_0, \ldots, s_{k-1}\}$ is known to all nodes in the network. Nodes record the most recent transmission $r_0$ (Can be its own transmission or an overheard transmission). $r_0 \in \{si\} \cup Col$, where Col represents a transmission without ACK. Nodes update Pos according to $r_0$ and a synchronization state ST. There are two states of ST: RAND and SYNC. Initially, ST is RAND. If $r_0$ is Null (never heard any transmissions) or Col, nodes set ST to RAND and Pos to Null. If $r_0 \in \{si\}$ and ST is RAND, which means there is no Pos synchronization before this transmission, nodes set Pos to the smallest position matching $r_0$ in S and set ST to SYNC. If $r_0 \in \{si\}$ and ST is SYNC, nodes simply increment the position of Pos by 1 (line 8).

---
Algorithm 1: LWT-Baseline
---

```
 1: function POSSYNC
 2:    if (r0 == Col) or (r0 == Null) then
 3:       ST=RAND, Pos=Null
 4:       return
 5:    else if ST==RAND then
 6:       Pos=PosMatch(-1)
 7:    else
 8:       Pos=(Pos+1)modk
 9:    end if
10:    if Pos!=Null then
11:       ST=SYNC
12:    end if
13: end function
14: function POSMATCH(prevPos)
15:    i =(prevPos+1) mod k
16:    for j =1 to k do
17:       if si == r0 then
18:          return i
19:       end if
20:       i =(i + 1) mod k
21:    end for
22:    return Null
23: end function
```

Self-Triggering

The backoff mechanism is used to trigger the transmission of the current scheduled link. Note that, since nodes need to freeze the backoff timer once the channel becomes busy, nodes constantly listen to the channel when counting down the backoff number. Thus, once a new transmission is overheard, a node freezes the backoff timer, updates Pos, and determines a new backoff number according to the state ST. If ST is SYNC, it uses Pos to find the current schedule slot. If the node is scheduled in the current schedule slot, it sets the backoff number to 0. Otherwise, it sets a large backoff number and waits for Pos update. If ST is RAND, the node carries out random backoff as DCF.

Transmission Completions

Nodes need to learn the completion of the current transmission to start the next transmission in schedule. In DCF, nodes always track the completion of each transmission in order to start the backoff mechanism. LWT utilizes the same mechanism to track transmission completions.

The Next Schedule Slot: In LWT, nodes go to the next schedule slot simply by incrementing the position of Pos by 1.

Work Conservation with Non-Backlogged Nodes

It can be hard to determine the schedule when nodes do not always transmit. However, collecting queue status from all nodes brings overheads and delays. A work-conserving mechanism in LWT (LWT-WC) utilizes the carrier sense/ clear channel assessment (CS/CCA) mechanism of Wi-Fi to automatically release unused resources to other nodes when the scheduled node doesn't transmit.

CS/CCA of Wi-Fi

Figure 8:
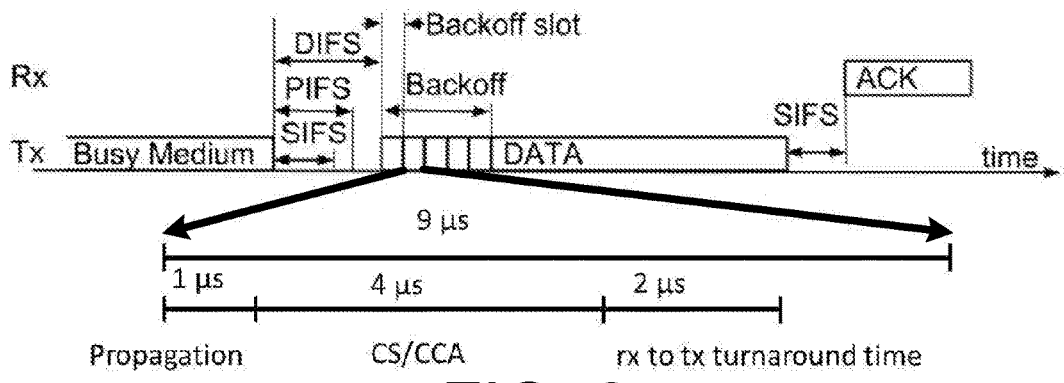
FIG. 8 is a schematic diagram demonstrating one embodiment of a backoff method.

An advantage associated with LWT-WC is found in that the CS/CCA mechanism of Wi-Fi. Wi-Fi packets contain a PLCP preamble in the beginning for synchronization. It is also used for CS/CCA to identify the start of a transmission through auto-correlation or cross-correlation. The IEEE 802.11 standard specifies that an OFDM transmission at a receive level no less than the minimum sensitivity (−82 dBm for 20 MHz channel) shall cause CS/CCA to indicate channel busy with a probability over 90% within 4 µs (for 20 MHz channel). This timing is sufficient for nodes to identify the start of a transmission within a backoff slot (9 µs). A detailed illustration of this is shown in FIG. 8. A node starts to transmit at the beginning of a backoff slot if its backoff timer expires. The propagation delay is around 1 µs, and nodes take 4 µs to identify the start of a transmission. If a transmission is detected, nodes hold the backoff timer. If no transmission is detected, since the receive to transmit turn-around time of a node is less than 2 µs, it is sufficient for a node to prepare to transmit in the beginning of the next backoff slot if its backoff timer expires.

Work-Conserving

Utilizing the ability of identifying the start of a transmission within a backoff slot (which is an ability required by IEEE 802.11 standard), LWT-WC classify schedule slots into different types according to the timing of the start of the transmission.

Classifying Schedule Slots

LWT-WC classifies slots into two types: "sync slot" and "rand slot." If the current scheduled node transmits, it is identified as a sync slot. Otherwise, this slot becomes a rand slot, and all nodes can contend for this slot using DCF. The identification of sync slot and rand slot is automatically carried out with CS/CCA and backoff mechanism. In LWTWC, when nodes are not scheduled in the current schedule slot, they pick a random backoff number $\geq 1$. Since the current scheduled node sets backoff number to zero, nodes identify the start of a transmission within the first backoff slot if the current scheduled node transmits. Otherwise, if there is no transmission starting within the first backoff slot, nodes continue to backoff and this slot becomes a rand slot.

Algorithm 2, below, illustrates the Pos synchronization and self-triggering mechanism of LWT-WC. Nodes record a parameter $w_t$, which is the waiting time between the current transmission and the previous transmission, and a parameter $w_{t\_thd}$. If the previous transmission is Col, $w_{t\_thd}$ is set to (EIFS+SlotTime/2), where EIFS is the interframe space after an erroneous transmission and SlotTime is the time duration of a backoff slot; otherwise, $w_{t\_thd}$ is set to (DIFS+SlotTime/2). Transmissions in rand slots won't trigger reset of ST even if it is a collision Col. That is, if there is a collision in a rand slot, ST will remain the same value, and if ST is SYNC, nodes simply increase Pos by one (line 9). When nodes are not scheduled in the current schedule slot, they pick a random backoff number $b \geq 1$.

---
Algorithm 2: LWT-WC
---

```
1: function POSSYNC
2:    if (r0 == Col and wt <wt_thd) or (r0 == Null) then
3:       % rand slot does not trigger reset of ST
4:       ST=RAND, Pos=Null
5:       return
```

-continued

Algorithm 2: LWT-WC

```
 6:     else if ST==RAND then
 7:         Pos=PosMatch(-1)
 8:     else
 9:         Pos=(Pos+1)modk
10:     end if
11:     if Pos!= Null then
12:         ST=SYNC
13:     end if
14: end function
15: function SELFTRIGGER
16:     if ST==SYNC and myself==current scheduled node then
17:         set backoff to zero
18:     else if ST==SYNC then
19:         do random backoff as DCF with b ≥ 1
20:     else
21:         do random backoff as DCF
22:     end if
23: end function
```

Decodability vs. Detectability

In certain scenarios, overheard transmissions cannot be decoded. Nodes sometimes cannot get information from overheard transmissions. However, using extra signals/control frames introduces overhead. Although nodes in LWT only need the Tx and Rx addresses of the first successful transmission for Pos synchronization, re-synchronization can be triggered by change of schedule, sleeping nodes, new nodes, transmission errors, and collisions. Identifying the addresses of transmissions in sync slots is important under those re-synchronization situations. Thus, the conditional Viterbi algorithm can be employed in LWT (LWT-CV) to help nodes identify addresses of a transmission when it cannot be decoded.

Theoretical Error Rate of Identifying Addresses

Under the conditional Viterbi algorithm, instead of considering all decode paths, only a subset of decode paths are considered when decoding. Since the target schedule S contains addresses of all nodes in the network, it can consider only the n addresses in S rather than all MAC addresses, which reduces the number of decode paths from $2.8 \times 10^{14}$ to n (the number of nodes), which practically is less than 50 in a single collision domain. The large reduction of number of decode paths greatly increases the distance between paths and also restricts the possibility of errors to only certain bits, thus the error rate decreases significantly.

Conditional Viterbi Algorithm

Convolutional Code

Wi-Fi uses convolutional code for channel coding. Convolutional code is an error-correcting code. Small bit errors can be recovered by observing the whole sequence. The encoder can be viewed as a finite-state machine.

Decoding with an Address Tree

Viterbi algorithm is an optimal algorithm for decoding convolutional codes. It utilizes dynamic programming to find the decode path with minimum distance. Conditional Viterbi algorithm is based on Viterbi algorithm, but only considers certain decode paths. An address tree is built according to addresses in S, and only the decode paths in the address tree are considered.

Algorithm

Algorithm 3, below, illustrates the conditional Viterbi Algorithm, where tree is the address tree built according to addresses in S. Each time the received/overheard transmission can not be decoded, conditional Viterbi algorithm is used to identify the Rx and Tx addresses. A parameter, tree state, is used to trace the current location in the address tree.

tree_state is set to the root of address tree at the first bit of each address (line 12). Then, only the input that has a path in the tree will be considered when decoding (line 15).

Algorithm 3: Conditional Viterbi Algorithm

```
 1: function CONDVIT(recv_bits, trellis, end_of_addr, init_of_addr, tree)
 2:     Num States= trellis.numStates
 3:     n_addr_bit = 48
 4:     metrics = zeros(NumStates, end_of_addr+1)+inf
 5:     path = zeros(NumStates, end_of_addr+1)-1
 6:     tree_state = zeros(NumStates, end_of_addr+1)-1
 7:     metrics(1,1)=0
 8:     for i = 1 to end_of_addr do
 9:         for state = 1 to NumStates do
10:             if metrics(state,i)!=inf then
11:                 if (i==init_of_addr)or(i== init_of_addr + n_addr_bit) then
12:                     tree_state(state,i)=root
13:                 end if
14:                 for input = 0 to 1 do
15:                     if(i<init_of_addr)or(tree(tree_state(state,i),input)!=NULL)then
16:                         next_state=trellis.nextStates(state,input)
17:                         output= trellis.outputsstate,input
18:                         mt=sum_diff(output,recv_bits(i))+metrics(state,i)
19:                         if mt < metrics(next_state,i+1) then
20:                             metrics(next_state,i+1)= mt
21:                             path(next_state,i+1)= state
22:                             if i ≥ init_bit_addr then
23:                                 next_tree_state=tree(tree_state(state,i),input)
24:                                 tree_state(next_state,i+1)=next_tree_state
25:                             end if
26:                         end if
27:                     end if
28:                 end for
29:             end if
30:         end for
31:     end for
32:     % trace back the path with minimum metrics
33:     decode = TraceBackPath(path, min(metrics), trellis)
34:     decoded_addr=decode(init_of_addr:end_of_addr)
35: end function
```

Partial Connectivity

In certain scenarios, some transmissions cannot be overheard, causing hidden terminals problems. RTS/CTS is a famous solution for hidden terminal problems. However, it introduces considerable overhead and has unfairness problems in certain scenarios. Thus, a transparent transmission mechanism in LWT (LWTTT) deals with hidden terminal problems in a single collision domain.

Hidden Terminal Problem in a Single Collision Domain

Figure 9:
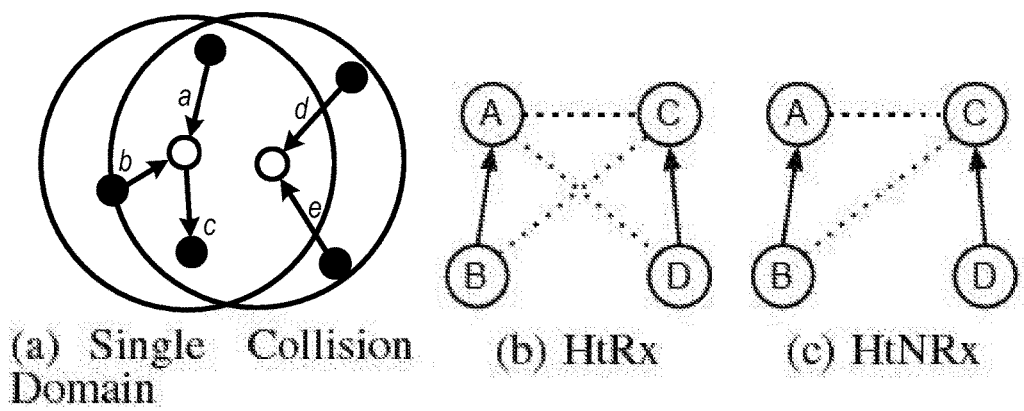
FIG. 9 is a schematic diagram showing several situations in which certain clients cannot receive transmissions from other clients.

A single collision domain is defined as "a set of links in which transmissions through any two of them cause a collision." A single collision domain is shown in FIG. 9(a). Hidden terminal problems occur when Tx of links cannot be overheard. Hhidden terminal problems in a single collision domain can be classified into 2 types: 2) HtRx: where at least one node of each link can be overheard by all nodes in the single collision domain (FIG. 9(b)); and 2) HtNRx: where there exists a link where both Rx and Tx cannot be overheard by some nodes in the single collision domain (FIG. 9(c)).

One solution for the hidden terminal situation is to exchange RTS/CTS before a data transmission. However, RTS/CTS introduces extra 116 µs to each transmission. In a packet of 1500 bytes transmitting in 54 Mbps, the overhead caused by RTS/CTS is 26%. Also, RTS/CTS cannot solve unfairness problems in HtNRx scenarios. In the example shown in FIG. 9(c), it is very hard for node D to win a contention. Since the transmission of node B interferes the reception of node C, but the transmission of node D does not interfere reception of node A or B, RTS transmitted from node D to node C can be corrupted by node A or B easily. Also, since node D cannot hear the RTS/CTS of node A and B, it can keep retransmitting RTS while any of the 2 nodes are transmitting. This makes node D use unnecessary large backoff numbers.

In order for LWT to gain Pos synchronization, the start and end time of a transmission need to be learned by all nodes in the single collision domain. The system first assumes that if every node that hears a transmission, broadcasts the information of this transmission, all nodes in a single collision domain can get the information of this transmission. If there is a node that cannot get the information of a transmission, this means that all of its Rx cannot hear this transmission, thus this node actually can transmit without interfering with the on-going transmission, which contradicts the definition of a single collision domain.

Transparent Transmissions

Figure 10:
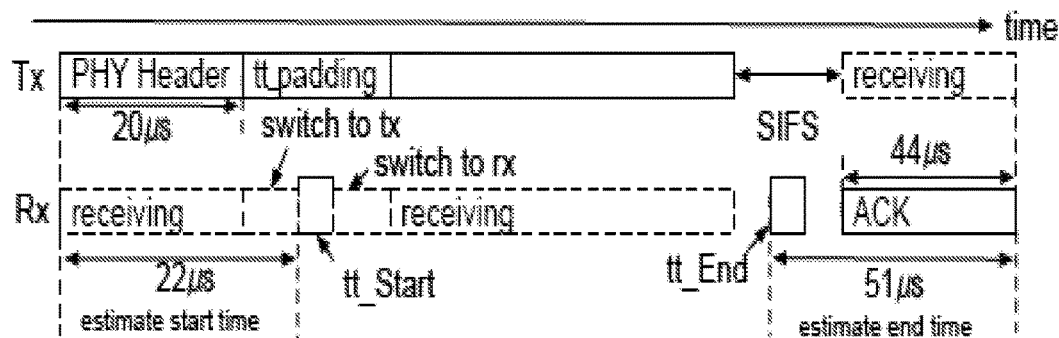
FIG. 10 is a schematic diagram demonstrating one method of dealing with the situation shown in FIG. 9.

In order to pass the transmission information to all nodes in the single collision domain, a mechanism referred to herein as "transparent transmissions" is used. When a node receives or overhear a transmission, it transmits a special signal, tt_Start, to indicate the start of a transmission. After the transmission is finished, the node transmits during SIFS another special signal, tt_End, indicating the end of this transmission. A timeline of a transparent transmission is shown in FIG. 10. Nodes receive tt_Start and tt_End can use the timing of these signals to estimate the start and end time of the current transmission. Since all nodes that hear the current transmission transmit those signals, all nodes in the single collision domain learn the start and end time of the current transmission. Transparent transmissions needs to satisfy the following conditions: i) when overlapping with data packets, the special signal can be easily identified under low SNR without extra hardware requirements; ii) the transmission of the special signal can not disturb the reception of data packets; and iii) the reception of special signal can not disturb the reception of data packets.

Flash Signal

This embodiment of LWT uses flash signals introduced by Flashback as the special signal in transparent transmissions. Flash signals are sinusoids with frequency equal to a certain subcarrier of the current Wi-Fi channel, and with duration equal to a OFDM symbol (4 μs). Since flash signals can use any of the 36 sub-carriers in a Wi-Fi channel, there are at least 36 different flash signals, and transparent transmissions only use 2 of them for tt_Start and tt_End. Since the Fourier transform of a sinusoidal wave is delta functions, as evaluated in the experiments of Flashback, flash signals can be detected easily by simple peak detection algorithm without extra hardware requirements (the transmit/detect of flash signals can be achieved through software/firmware changes by reusing OFDM DSP blocks). The ease of detection guarantees the robustness of transparent transmissions. Still, packet receptions won't be disturbed by flash signals as long as the flash rate is less than 50,000 flashes per second.

Switch to Transmit while Receiving

Due to the half-duplex property of Wi-Fi radios, a node cannot transmit a flash signal while receiving. Thus, LWT employs a "switch to transmit while receiving" mechanism for nodes to transmit flash signals while receiving. A tt_padding, which contains only zeros, is inserted after the PHY header of each packet. After receiving the PHY header of a packet, a node switches to transmit tt_Start, and then switch back to continue receiving. Since the received portion that missed due to transmitting tt_Start is tt_padding, the packet can be received successfully. The tt_padding also ensures that the reception of special signal does not disturb the reception of data packets. The length of tt_padding considers both switch time and signal transmission time.

Transmit During SIFS

In order to inform other nodes the end of the current transmission, another flash signal, tt_End, is transmitted after the DATA transmission is finished. Nodes utilize the SIFS duration between DATA and ACK to transmit tt_End. Since SIFS is 10 μs, the duration of tt_End is 4 μs, and the receive to transmit turnaround time is smaller than 2 μs, the time duration of SIFS is quite sufficient for transmitting tt_End.

Algorithm

The Pos synchronization and self-triggering of LWT-TT is similar to that of LWT-WC, only with small differences. For self-triggering, every node maintains a record of "overheard nodes." Initially, a node assumes that it cannot overhear any node and update this record as it starts to overhear transmissions. If the Tx of current schedule slot is recorded as "cannot overhear," the node waits extra 24 μs after DIFS for possible flash signals. Otherwise, the self-triggering is the same as that of LWT-WC.

For ease of Pos synchronization, since transparent transmissions only carry information of the start and end time of a transmission, there are 2 unknown information: i) if ACK is transmitted, and ii) the Rx and Tx addresses of the transmission. Again, nodes utilize the "overheard nodes" record. If the Rx of the transmission cannot be heard, nodes assume that ACK is transmitted and will not reset its ST to RAND. If the Tx of the transmission cannot be heard, nodes stay in RAND when ST is RAND, and increase Pos by 1 if ST is SYNC. (Note that nodes still can use timing to identify sync slots and rand slots.)

A new state of ST, tempSYNC, is introduced for ease of Pos synchronization. If nodes hear sync slots while its ST is RAND, it tries to synchronize using those sync slots. However, if the number of overheard sync slots is not enough for a node to figure out the position of Pos, a node can synchronize to itself and switches its ST from RAND to tempSYNC when it has the first successful transmission in a rand slot. When ST is tempSYNC, nodes setup its Pos (match to its own successful transmission) and transmit in its scheduled slots indicated by its Pos. If the transmissions (transmit using sync slots) in the scheduled slots succeed, nodes switch its ST from tempSYNC to SYNC after a schedule duration. Otherwise, if any collision happens in the sync slots, ST is switched from tempSYNC to RAND.

On the other hand, if a collision happens in a sync slot, a node will not directly switch from SYNC to RAND. It first switches from SYNC to tempSYNC for a schedule duration. If a collision happens in a sync slot again when ST is temp-SYNC, it switches from tempSYNC to RAND. FIG. 11 shows the state diagram of ST. The rest of the algorithm is same as that of LWT-WC.

Supporting Backward Compatibility

This embodiment of LWT is backward compatible, and can operate with legacy nodes without separating them to a different time duration. Legacy nodes can transmit in rand slots, in which all nodes operate DCF. If the traffic load from legacy nodes is high, the central controller can schedule special legacy-only slots that LWT nodes won't contend for. Although the probability of legacy nodes disturbing sync slots is non-zero, this probability decrease exponentially due to the exponential grow of the contention window (cw) in DCF. For example, the probability of a legacy node disturbing a sync slot is 6% (the probability of a legacy node selecting zero as its backoff number with cw=15) in the first time, 3% (cw=31) for the second time, and becomes less than 1.5% (cwM3) after the third time. The tempSYNC state also helps LWT nodes to be more robust against disturbance.

If there are legacy nodes that cannot overhear the current transmission, the Tx will use a tt_padding of 13 OFDM symbols and the Rs transmits CTS (44 µs) with tt_Start during the tt_padding. The disturbing probability, which also decreases exponentially, is 18% in this situation (the probability of a legacy node selecting a backoff number which leads to a backoff time 22 µs).

LWT can also use PIFS, an IFS shorter than DIFS, in sync slot to decrease the disturbing probability. PIFS is used by APs and non-AP nodes under PCF, in which the behavior of non-AP nodes is under control of the AP. Since the behavior of nodes in sync slots is also under control of the central controller, it is reasonable to allow nodes to use PIFS in sync slots.

In LWT, nodes need information of all MAC addresses in the network for LWT-CV. Since all legacy nodes need to associate with an AP, the MAC addresses of legacy nodes can be collected by APs and give to all nodes the same way as the target schedule S. Nodes can also collect legacy MAC addresses by learning from overhearing.

Sleeping Nodes

LWT nodes lose Pos synchronization after sleeping since they cannot overhear transmissions during sleeping. Using fixed duration for each transmission can make sleeping nodes keep Pos synchronization. However, fixed transmission time requires packet aggregation and fragmentation, which introduces extra delays. Thus, instead of using fixed duration for each transmission, sleeping nodes achieve Pos synchronization by overhearing sync slots or synchronizing to itself through tempSYNC state. Once a node wakes up from sleeping, it operates DCF until it hears enough sync slots to identify the position of Pos. However, if the node didn't hear any sync slots for a schedule duration, it switches to tempSYNC state when it successfully finishes a transmission in a rand slot (synchronizes to itself). If the later transmissions in sync slots succeed, nodes switches to SYNC state after a schedule duration. Otherwise, if any collision happens in sync slots, ST is switched from tempSYNC to RAND.

Schedule Updates and Membership Changes

The target schedule is determined by the central controller using scheduling algorithms such as. The target schedule is broadcasted by APs periodically. Although broadcasting is efficient, it is not reliable. Transmitting following different schedules can cause collisions in sync slots. Thus, LWT employs a mechanism that quickly indicates the update of S. The update of S is indicated by another flash signal, S_update, transmitted by APs along with DATA or ACK. Since flash signals can be transmitted frequently (50,000 flashes per second) without disturbing receptions, and can be identified even when colliding with other flash signals, nodes learn the update of S quickly and reliably. Once receive S_update, nodes operate DCF until they overhear the new S. Thus, although there might be some delay of getting the new S, nodes won't disturb sync slots once they receive S_update.

When a node wants to join the network, it operates DCF until overhearing S from APs. New nodes get Pos synchronization the same way as sleeping nodes. Each AP maintains a client list and periodically sent it to the central controller for updating S.

Multiple Collision Domains

It is possible to extend them for multiple collision domains. This may be accomplished using different flash signals to delivery transmission information of different collision domains. There are 36 subcarriers that can be used by flash signals and LWT only needs 2 for each collision domain. In multiple collision domains, multiple transmissions can be scheduled in the current schedule slot. Nodes increase Pos by one only after confirming the end of transmissions of all collision domains in the current schedule slot. This can be learned by either overhearing or receiving flash signals.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for a first client of a plurality of clients to transmit data to an access point via a shared medium network, the method comprising the steps of:
   (a) receiving, by the first client, a transmission schedule, which assigns transmission time slots to individual clients of the plurality of clients, from the access point;
   (b) performing, by the first client, a collision avoidance scheme to determine an offset amount of time to begin transmitting data;
   (c) when the offset amount of time has expired, then sensing when any of the plurality of clients is transmitting data on the network and executing, by the first client, the following steps:
      (i) when a second client of the plurality of clients is transmitting data, then setting a first time slot assigned to the second client on the transmission schedule as a starting time slot, tracking the transmission schedule and transmitting data to the access point during the next time slot assigned to the first client after the starting time slot; and
      (ii) when no other client is transmitting data, then transmitting data to the access point, setting the first time slot assigned to the first client as the starting time slot and tracking the transmission schedule and transmitting data to the access point during the next time slot assigned to the first client after the starting time slot;
   (d) tracking, by the first client, the transmission schedule and transmitting data to the access point during each successive time slot assigned to the first client; and
   (e) when the current time slot has been assigned to the first client, the first client setting an offset time associated with the first client to zero, thereby causing the first client to begin transmitting data to the access point.

2. The method of claim 1, further comprising the steps of:
   (a) monitoring the network to determine when data is being transmitted during time slots that are assigned to other clients;
   (b) when no data transmission is detected during a period of time after a time slot assigned to another client begins, then:
      (i) performing the collision avoidance scheme to determine an offset amount of time to begin transmitting data; and
   (c) when the offset amount of time has expired, then sensing when any of the plurality of clients is transmitting data on the network and executing the following steps:

(i) when another client of the plurality of clients is transmitting data, then resume tracking the schedule; and
(ii) when no other client is transmitting data, then transmitting data to the access point during the time slot and then resume tracking the schedule.

3. The method of claim 1, wherein the step of setting a first time slot assigned to the second client on the transmission schedule as a starting time slot comprises the step of determining a network address for the second client.

4. The method of claim 3, wherein the network address for the second client is determined using a conditional Viterbi algorithm that considers only address decoding paths of addresses of clients known to be connected to the network.

5. The method of claim 1, wherein the step of sensing when any of the plurality of clients is transmitting data on the network, when no data is sensed on the network, is accomplished by executing the following steps:
(a) receiving a start flash signal from the access point indicating that another client is currently transmitting data to the access point; and
(b) receiving a stop flash signal from the access point indicating that the other client has ceased transmitting data to the access point.

6. The method of claim 1, wherein the schedule includes at least one time slot during which the plurality of clients employ a distributed coordination function to access the network, thereby allowing legacy clients to access the network.

7. The method of claim 1, wherein the step of performing a collision avoidance scheme comprises executing an exponential back-off algorithm.

8. A method of controlling transmission from a plurality of clients to an access point via a shared medium network, the method comprising the steps of:
(a) publishing a transmission schedule from the access point to each of the plurality of clients, in which the transmission schedule assigns transmission time slots to individual clients of the plurality of clients;
(b) each client performing a collision avoidance scheme to determine which of the plurality of clients will be a first winning client of the plurality of clients;
(c) transmitting data from the winning client to the access point during a first time slot assigned to the winning client and each client setting a current time slot as a first time slot in the transmission schedule;
(d) during each next time slot subsequent to the first time slot assigned to the winning client, allowing the client assigned to the next time slot to transmit data to the access point; and
(e) each client tracking the schedule and transmitting data at a subsequent assigned time slot and when a one of the clients detects that a current time slot is assigned to that one of the clients, that one of the clients setting its offset time to zero, thereby causing that one of the clients to begin transmitting data.

9. The method of claim 8, further comprising the steps of:
(a) each client detecting when an assigned client is not transmitting during a particular time slot and, when the assigned client is not transmitting during the particular time slot; and
(b) when an assigned client is not transmitting during the particular time slot, then performing the steps comprising:
(i) performing the collision avoidance scheme by each of the plurality of clients that are not assigned to the particular time slot to determine which of the plurality of clients that are not assigned to the particular time slot is a subsequent winning client;
(ii) transmitting data from the subsequent winning client to the access point during the particular time slot; and
(iii) following the transmission schedule after the particular time slot.

10. The method of claim 8, wherein the publishing a transmission schedule step occurs periodically.

11. The method of claim 8, wherein the step of performing a collision avoidance scheme comprises executing an exponential back-off algorithm.

12. The method of claim 8, wherein each client performs steps comprising:
(a) monitoring the network to determine when data is being transmitted during time slots that are assigned to other clients;
(b) when no data transmission is detected during a period of time after a time slot assigned to another client begins, then:
(i) performing the collision avoidance scheme to determine an offset amount of time to begin transmitting data; and
(ii) when the offset amount of time has expired, then sensing when any of the plurality of clients is transmitting data on the network and executing the following steps:
(1) when another client of the plurality of clients is transmitting data, then resume tracking the schedule; and
(2) when no other client is transmitting data, then transmitting data to the access point during the time slot and then resume tracking the schedule.

13. The method of claim 8, wherein the step of setting a current time slot as a first time in the transmission schedule comprises the step of determining a network address for the winning client.

14. The method of claim 13, wherein the network address for the winning client is determined using a conditional Viterbi algorithm that considers only address decoding paths of addresses of clients known to be connected to the network.

15. The method of claim 8, wherein the access point alerts all of the plurality of clients that a selected one of the clients so that even when others of the plurality of clients cannot detect transmission from the selected one of the clients by performing steps comprising:
(a) transmitting a start flash signal to all of the plurality of clients indicating that one of the plurality of clients is currently transmitting data to the access point; and
(b) transmitting a stop flash signal f to all of the plurality of clients indicating that the one of the plurality of clients has ceased transmitting data.

16. The method of claim 8, wherein the schedule includes at least one time slot during which the plurality of clients employ a distributed coordination function to access the network, thereby allowing legacy clients to access the network.

17. A digital communications system, comprising:
(a) an access point router, in communication with a shared medium network, that generates a transmission schedule that assigns transmission time slots; and
(b) a plurality of client devices, each of which including a processor and a computer-readable memory, each of the plurality of client devices in communication with the shared medium network and each client device configured to:

(i) receive the transmission schedule, in which each transmission time slot is assigned to a first client device of the plurality of client devices;
(ii) perform a collision avoidance scheme to determine an offset amount of time to begin transmitting data;
(iii) when the offset amount of time has expired, then sense when any of the plurality of client devices is transmitting data on the network and execute the following:
  (1) when a second client device of the plurality of client devices is transmitting data, then set a first time slot assigned to the second client device on the transmission schedule as a starting time slot, track the transmission schedule and transmit data to the access point during the next time slot assigned to the first client device after the starting time slot; and
  (2) when no other client is transmitting data, then transmit data to the access point, set the first time slot assigned to the first client device as the starting time slot and track the transmission schedule and transmitting data to the access point during the next time slot assigned to the first client device after the starting time slot; and
(iv) after the first time slot, track the transmission schedule, set an offset time to zero when a current time slot is detected to be assigned to the client device, which causes the client device to transmit data to the access point.

18. The digital communications system of claim 17, wherein each of the plurality of client devices is further configured to:
(a) monitor the network to determine when data is being transmitted during time slots that are assigned to other client devices;
(b) when no data transmission is detected during a period of time after a time slot assigned to another client begins, then:
  (i) perform the collision avoidance scheme to determine an offset amount of time to begin transmitting data; and
  (ii) when the offset amount of time has expired, then sense when any of the plurality of client devices is transmitting data on the network and execute the following:
    (1) when another client of the plurality of client devices is transmitting data, then resume tracking the schedule; and
    (2) when no other client device is transmitting data, then transmit data to the access point during the time slot and then resume tracking the schedule.

19. The digital communications system of claim 17, wherein the setting a first time slot assigned to the second client device on the transmission schedule as a starting time slot requires the client to determine a network address for the second client device.

20. The digital communications system of claim 17, wherein the network address for the second client is determined using a conditional Viterbi algorithm that considers only address decoding paths of addresses of clients known to be connected to the network.

21. The digital communications system of claim 17, wherein sensing when any of the plurality of clients is transmitting data on the network, when no data is sensed on the network, is accomplished by:
(a) a start flash signal transmitted from the access point indicating that another client device is currently transmitting data to the access point; and
(b) a stop flash signal transmitted from the access point indicating that the other client device has ceased transmitting data to the access point.

22. The digital communications system of claim 17, wherein the schedule includes at least one time slot during which the plurality of client devices employ a distributed coordination function to access the network, so as to allow legacy client devices to access the network.

23. The digital communications system of claim 17, wherein the shared medium network comprises a Wi-Fi network.

* * * * *